(12) United States Patent
Febonio et al.

(10) Patent No.: US 9,215,331 B2
(45) Date of Patent: Dec. 15, 2015

(54) DUAL LAYER AUTHENTICATION FOR ELECTRONIC PAYMENT REQUEST IN ONLINE TRANSACTIONS

(75) Inventors: Barbara Febonio, Rome (IT); Sandro Piccinini, Campano (IT)

(73) Assignee: International Business Machines Corporation, Armonk, NY (US)

(*) Notice: Subject to any disclaimer, the term of this patent is extended or adjusted under 35 U.S.C. 154(b) by 449 days.

(21) Appl. No.: 12/572,321

(22) Filed: Oct. 2, 2009

(65) Prior Publication Data
US 2010/0088228 A1 Apr. 8, 2010

(30) Foreign Application Priority Data
Oct. 2, 2008 (EP) .................................. 08165705

(51) Int. Cl.
*G06Q 40/00* (2012.01)
*G06Q 20/02* (2012.01)
*H04M 15/00* (2006.01)
*G06Q 20/10* (2012.01)
*G06Q 20/12* (2012.01)
*G06Q 20/32* (2012.01)
*G06Q 20/40* (2012.01)
(Continued)

(52) U.S. Cl.
CPC ............. *H04M 15/00* (2013.01); *G06Q 20/105* (2013.01); *G06Q 20/12* (2013.01); *G06Q 20/327* (2013.01); *G06Q 20/40* (2013.01); *G06Q 20/425* (2013.01); *G06Q 30/0603* (2013.01); *H04M 15/47* (2013.01); *H04M 15/48* (2013.01); *H04M 15/8005* (2013.01); *H04M 15/85* (2013.01); *H04M 15/851* (2013.01); *H04M 15/858* (2013.01); *H04M 17/00* (2013.01); *H04W 4/24* (2013.01); *H04M 2215/0148* (2013.01); *H04M 2215/0156* (2013.01); *H04M 2215/815* (2013.01); *H04M 2215/8183* (2013.01)

(58) Field of Classification Search
CPC ........ G06Q 40/00; G06Q 20/29; G06Q 20/22
USPC ................. 705/1–75; 709/1–207; 235/1–379; 713/1–201; 380/1–25
See application file for complete search history.

(56) References Cited

U.S. PATENT DOCUMENTS 6,128,391 A 10/2000 Denno et al.
6,736,313 B1 * 5/2004 Dickson ........................ 235/380
(Continued)

OTHER PUBLICATIONS

Febonio et al., "Method and System for Dual Layer Authentication for Electronic Payment Request in Online Transactions," US. Appl. No. 13/442,450, filed Apr. 9, 2012, 20 pages.
(Continued)

*Primary Examiner* — Marissa Liu
(74) *Attorney, Agent, or Firm* — Yee & Associates, P.C.; Joseph Petrokaitis (57) ABSTRACT

Increasing the security of online payment requests by introducing a dual-layer authentication system for accessing the funds and/or credit through payment cards is described. An additional check regarding the identity of a card user to be included within a traditional security protocols for these cards, wherein the additional check is based on an authentication channel which is external to the user's card. A device owned by the legitimate card owner certifies that the user of the card at any given instant is the legitimate owner of the card and not someone else. To process this additional information, a connection by means of a proximity based device is established.

7 Claims, 4 Drawing Sheets

(51) Int. Cl.
  *G06Q 20/42* (2012.01)
  *G06Q 30/06* (2012.01)
  *H04M 17/00* (2006.01)
  *H04W 4/24* (2009.01)

(56) References Cited

U.S. PATENT DOCUMENTS

| | | | |
|---|---|---|---|
| 7,003,497 B2* | 2/2006 | Maes | 705/64 |
| 7,603,556 B2 | 10/2009 | Brown et al. | |
| 7,654,204 B2 | 2/2010 | Forbes | |
| 7,707,113 B1 | 4/2010 | DiMartino et al. | |
| 7,865,738 B2 | 1/2011 | Buck et al. | |
| 8,255,382 B2* | 8/2012 | Carpenter et al. | 707/707 |
| 8,423,466 B2 | 4/2013 | Lanc | |
| 8,577,804 B1 | 11/2013 | Bacastow | |
| 2002/0035539 A1* | 3/2002 | O'Connell | 705/39 |
| 2003/0154405 A1 | 8/2003 | Harrison | |
| 2003/0220835 A1 | 11/2003 | Barnes | |
| 2004/0010472 A1 | 1/2004 | Hilby et al. | |
| 2004/0177040 A1 | 9/2004 | Shiu | |
| 2005/0250473 A1* | 11/2005 | Brown et al. | 455/411 |
| 2006/0131390 A1 | 6/2006 | Kim | |
| 2006/0173792 A1 | 8/2006 | Glass | |
| 2006/0249574 A1 | 11/2006 | Brown et al. | |
| 2006/0273158 A1* | 12/2006 | Suzuki | 235/380 |
| 2007/0011099 A1* | 1/2007 | Sheehan | 705/65 |
| 2007/0080211 A1 | 4/2007 | Chen | |
| 2007/0086469 A1 | 4/2007 | Seo | |
| 2007/0150416 A1 | 6/2007 | Friedman | |
| 2007/0168282 A1 | 7/2007 | Giordano | |
| 2007/0260547 A1* | 11/2007 | Little | 705/52 |
| 2008/0014947 A1 | 1/2008 | Carnall | |
| 2008/0016003 A1* | 1/2008 | Hutchison et al. | 705/67 |
| 2008/0114678 A1 | 5/2008 | Bennett et al. | |
| 2008/0255992 A1* | 10/2008 | Lin | 705/44 |
| 2009/0048971 A1 | 2/2009 | Hathaway et al. | |
| 2009/0078777 A1 | 3/2009 | Granucci et al. | |
| 2009/0094681 A1* | 4/2009 | Sadler et al. | 726/4 |
| 2009/0139428 A1 | 6/2009 | Forbes | |
| 2009/0204457 A1 | 8/2009 | Buhrmann et al. | |
| 2009/0319428 A1 | 12/2009 | Febonio et al. | |
| 2012/0197803 A1 | 8/2012 | Febonio et al. | |

OTHER PUBLICATIONS

Final Office Action, dated Dec. 20, 2013, regarding U.S. Appl. No. 13/442,450, 24 pages.
Office Action, dated Mar. 6, 2014, regarding U.S. Appl. No. 13/442,450, 13 pages.
Office action dated Sep. 7, 2012 regarding U.S. Appl. No. 13/442,450, 11 pages.
Notice of Allowance, dated Mar. 27, 2015, regarding U.S. Appl. No. 13/442,450, 17 pages.
Office Action, dated Aug. 28, 2014, regarding U.S. Appl. No. 13/442,450, 6 pages.

* cited by examiner

DUAL LAYER AUTHENTICATION FOR ELECTRONIC PAYMENT REQUEST IN ONLINE TRANSACTIONS

TECHNICAL FIELD

The present invention relates to electronic payment requests and more particularly to a method, system and computer program for authenticating an electronic payment request with an increased level of security during online, transactions.

BACKGROUND

Use of bank cards, credit cards, debit cards or cash cards for making payments is becoming more and more frequent. These payment systems are relatively secure because they employ extensive security mechanisms. Usually a secret code must be provided by a purchaser and authenticated by a bank, to authorise the movement of funds from the purthaser's account to the vendor. Recent years have seen rapid growth in the use of credit cards and/or debit cards to purchase merchandise at point-of-sale locations, through public telephones or over the Internet. During these purchase transactions, some personal data is publicly released, albeit in a very limited way.

However, in view of the inherently public nature of telephone networks and/or the Internet, this personal information is at risk of interception. Identity theft is recognised as an increasingly important crime, wherein, despite all of the security checks used to authenticate and protect personal information, a credit/debit card may be cloned and used by malicious persons to rob money from the bank account of a legitimate user. In fact, in view of the almost instantaneous nature of today electronic transactions, even temporary ownership of a credit (or other payment) card could allow a malicious user to make a large number of payments either particularly through Internet.

US patent application Publication No. 2006/0131390 describes a system for providing a notification of a pending transaction request and obtaining an authorisation therefore from a cardholder. The system includes a phone number of a mobile device assigned to receive an authorisation request for a respective account. When a transaction request is received, the system identifies the phone number of the mobile device assigned to receive authorisation request messages for the account requesting the transaction. The system generates and transmits an authorisation request message to the determined phone number; and a reply message is returned from the mobile device which explicitly indicates if the user of the mobile device approves or refuses this transaction.

In a similar vein, US patent application Publication No. 2004/0177040 describes a method for securing a card transaction using a mobile device which is capable of preventing the card from being embezzled and counterfeited.

Both US2006/0131390 and US2004/0177040 effectively use a mobile device to send an authorisation request and await a reply message to authorise a payment request. Thus, these systems require:

an available mobile phone network to process the payment request;
a payment area which has a valid network signal (which is not always available in multi level stores); and
an interaction with the user who must reply to the authorisation request.

Other known prior art methods for enhancing the security of electronic payments are described in US applications Publication Nos. 2007/0080211 and 2007/0086469. However, these methods require some additional checks on shopping date, expense amount, user identity or supplementary secret code for payment authorization.

To solve the drawbacks of the prior art system, a co-pending application (same inventors, Filed in Europe as application number 08158820.4, also filed as U.S. application Ser. No. 12/486,073, entitled Authorizing An Electronic Payment Request) discloses a method and system for authenticating an electronic payment request made at a shop or point of sale with an additional layer of security being executed through an external device carried by the purchaser themselves. It would be desirable to extend a similar additional layer of security to those transactions which are completed through the web, without the need of a dedicated cash or sale terminal. It should be possible to complete these kinds of transactions from, for example, a home computer over the Internet.

SUMMARY OF THE INVENTION

According to the invention, there is provided a method for additional authorisation of an electronic payment request, during a main authorisation process of the electronic payment request for an online purchase by means of a browser, the browser running on a data processing device including proximity based transceiver means, the payment request being made with a payment card configured with details of at least one device in the possession of at least one owner of the card, the method comprising the steps of: suspending the main authorisation process; the proximity based transceiver means detecting the proximity of at least one portable device with whose details the payment card is configured; upon detection of at least one portable device establishing a communication session between the data processing device and the detected portable device; requesting a first code from the detected portable device; comparing the first code with a predetermined second code; resuming the main authorisation process in the event the first code substantially matches the second code.

BRIEF DESCRIPTION OF THE DRAWINGS

An embodiment of the invention is herein described, by way of example, with reference to the accompanying figures in which.

DETAILED DESCRIPTION OF THE INVENTION

Figure 1:
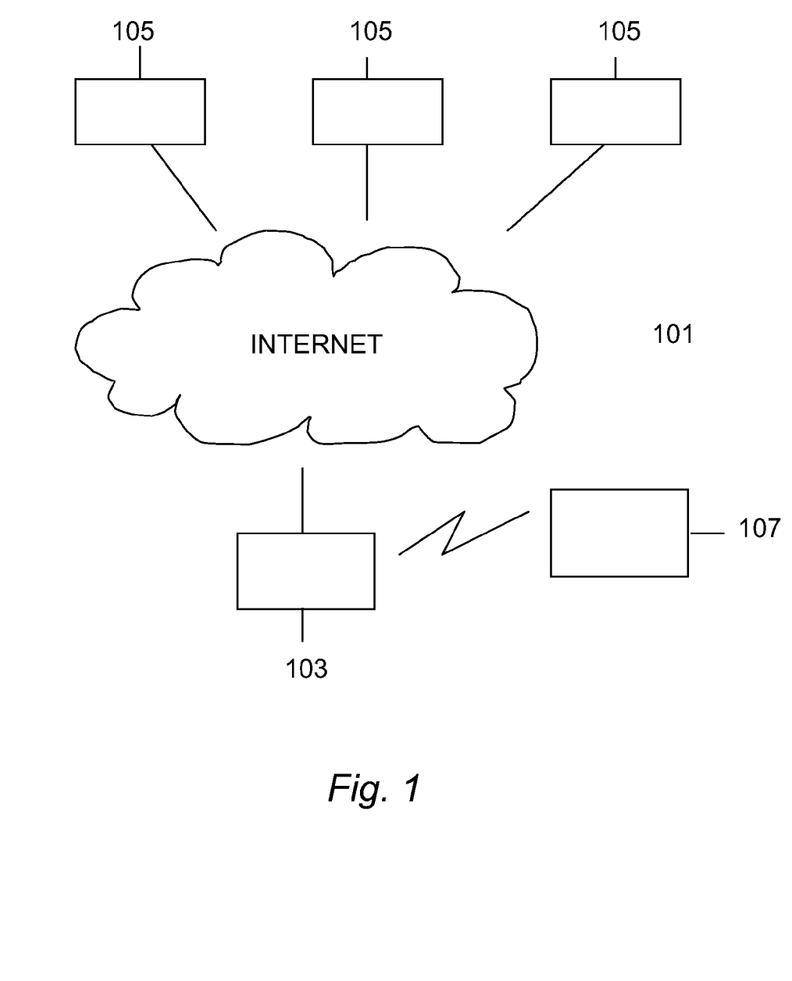
FIG. 1 is a schematic diagram of a system implementing a preferred embodiment of the present invention.

With reference in particular to FIG. 1, a system embodying the present invention is schematically represented. A network 101 (e.g., World Wide Web or Internet) allows a user to connect through a computer 103 (for example, a PC) to a number of remote servers 105. With such connection the user can perform transactions with servers 105, including online Shopping session where the purchased goods or services are paid by electronic payment means (e.g., by the use of an authorised Credit Card). It is possible that the payment is performed by connecting to a different server than the online shopping site (e.g. with a connection to a bank server). Usually the use of the card must be authorised and it is sometimes requested a PIN number; when a PIN is not requested, a check on the number and the expiry date of the card is normally done. According to a preferred embodiment of the present invention, an additional level of security check is introduced at the user computer 103. In order for the purchase to be authorised an additional check is performed, requiring the proximity of a user personal device 107, e.g., a mobile phone. In a preferred embodiment of the present invention, the authorising process exploits the proximity communication capability of the computer 103 (e.g., a Bluetooth transceiver) to interact with the external device 107. Other communication systems and protocols could be used instead, e.g., RFID or IrDA.

The preferred embodiment ensures that the authentication of a debit/credit card is not solely reliant upon the card itself. Instead, the preferred embodiment provides an additional layer of security into an authentication process, wherein this additional layer of security is executed through an external device carried by the purchaser themselves, exploiting the existing communications facilities of the computer through which the purchaser is completing the online transaction.

The current authentication system can be unchanged and the new functionality simply plugged on existing ones and offered as new service by the bank. The preferred embodiment minimally interferes with the existing security structures of banks and/or vendors. The new functionality of the preferred embodiment can be simply plugged into an existing traditional security mechanism and sold as a new service by a bank.

In contrast, with the aforementioned prior art documents, the preferred embodiment can leverage the following technologies:

(a) RFID technology to read an authorisation profile from a user-owned tag;

(b) a Bluetooth connection that is capable of:
silently reading if the user is carrying a device whose unique identifier (e.g. cellular IMEI) matches the one specified in the profile on the card;
establishing a Bluetooth handshake requiring a pin;
physically verifying that the user making the payment is in BT range.

(c) Infra-red communication, or more particularly, an Infrared data association (IrDA) connection to read the authorisation code from a user-owned device/tag.

Moreover, the preferred embodiment can leverage any type of profile stored in a user's mobile device to perform a check on a payment transaction. In particular, the preferred embodiment can automatically check a specific payment against a defined user-profile (e.g. an expenditure threshold for a particular type of shopping or a daily expenditure threshold etc.).

Figure 2:
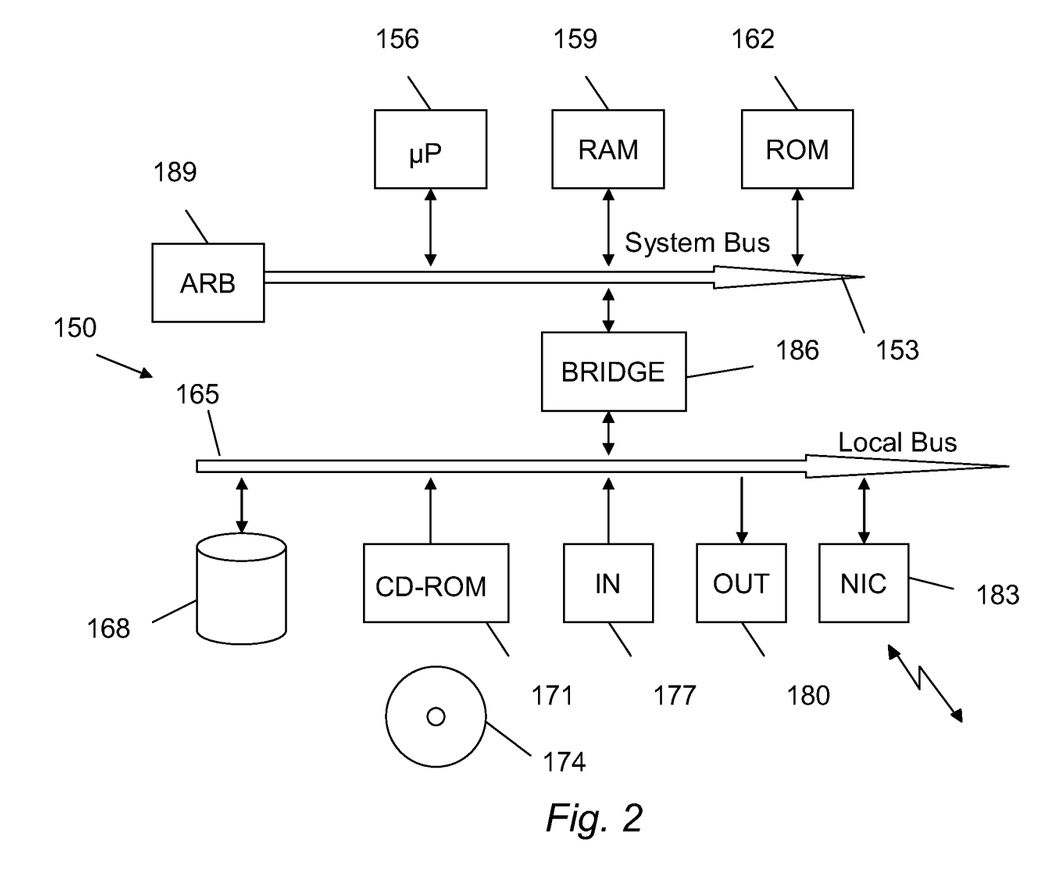
FIG. 2 is a block diagram of a computer system adapted to perform the method of a preferred embodiment of the present invention.

As shown in FIG. 2, a generic computer of the system (e.g. computer, Internet server, router, remote servers) is denoted with 150. The computer 150 is formed by several units that are connected in parallel to a system bus 153. In detail, one or more microprocessors 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). A Network Interface Card 183 is used to connect the computer 150 to the network, A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153. Similar considerations apply if the system has a different topology, or it is based on other networks. Alternatively, the computers have a different structure, include equivalent units, or consist of other data processing entities (such as PDAs, mobile phones; and the link).

The preferred embodiment of the present invention provides a mechanism for solving the problem of identity theft by introducing a dual-layer authentication system for accessing the funds and/or credit through payment cards through the Internet, i.e. without the need of an interaction with a shop or a point of sale. For simplicity, credit, debit, bank and cash cards etc. will be generically known henceforth as "payment cards". The users can conclude commercial or financial transactions from their own computers provided they are connected to the Internet, possibly through a secure connection. More particularly, the preferred embodiment provides an additional check regarding the identity of a card user to be included within a traditional security protocols for these cards, wherein the additional check is based on an authentication channel which is external to the user's card. To this end, the preferred embodiment leverages the use of a device (owned by the legitimate card owner) to certify that the user of the card at any given instant is the legitimate owner of the card and not someone else.

In support of the above, the preferred embodiment includes additional information into a traditional payment card. The additional information includes features that can be used to verify the identity of the registered owner of the card. For example, the additional information could include:
  a number of the registered owner's mobile phone;
  a unique International Mobile Equipment Identity (IMEI) code of the registered owner's mobile phone; and
  an identifier of an RFID tag carried by the registered owner.

Figure 3:
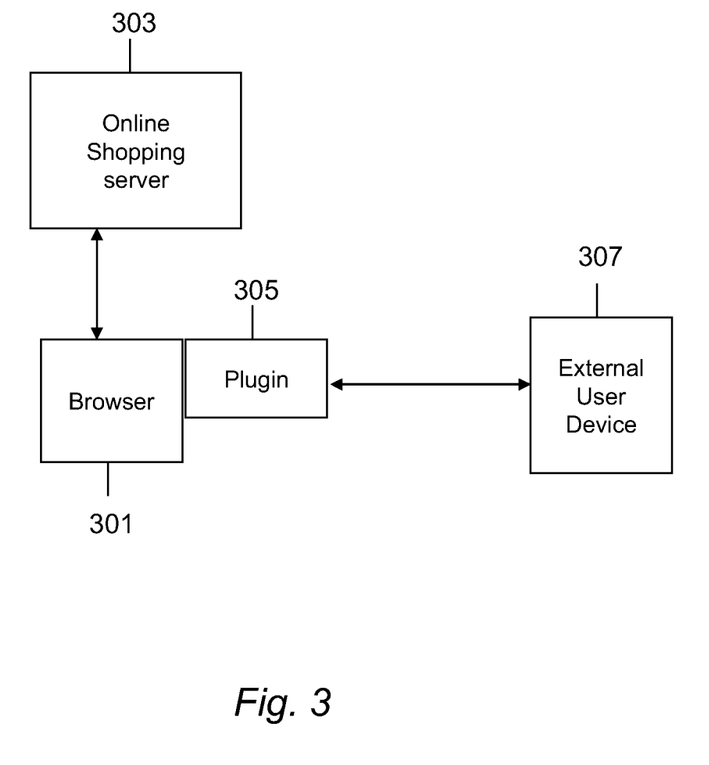
FIG. 3 is a schematic diagram of a preferred embodiment of the present invention.

As shown in FIG. 3, the preferred embodiment includes an Internet browser 301 which allows the user to interact with an Online Shopping Server 303 where the user can purchase goods and/or services; such goods and services can be paid with electronic payment means, e.g., a payment card. The Browser 301 must have a pluggable component 305 installed that is able to perform the additional checks. The pluggable component 305 is adapted to check the identity of the user of a payment card based on the additional information embedded within the card. When a user enters an online shopping site, to complete the purchasing process he is normally requested to enter the traditional payment card information. According to the preferred embodiment, during the transaction validation, if the used card is enabled for dual security, the web site will recognize that a second layer of security is required. At this point, the specific plug-in 305 of the browser 301 depending on user configuration can prompt the user asking to run the second level of information retrieving step or can automatically perform the secure check. Specifically, the browser plug-in 305 will contact the selected user device 307 (e.g., a mobile telephone) to retrieve the needed information (for example, IMEI code) using, for example, a Bluetooth connection. So the browser plug-in 305 will search for device in range asking if needed for a Bluetooth code to allow handshaking with the computer where the browser 301 resides and get the profiled information. For example, a card can be released from bank to customer requiring for second layer of security a cellular phone with IMEI xxxxyyyyyzzzz and/or a confirmation pin ABCD. This additional information retrieval can be prompted to the user (to start for example Bluetooth reception on device or enter the BT pin) or can be silently performed by the browser plug-in. In the latter case, specific security issues might be considered according to system administrator's preferences, computer configurations or the operating systems security restrictions (e.g., firewall). Once the additional information is collected, the browser 301 will send back the additional information to the transaction server where transactions are validated to grant or deny the payment.

If the authentication is successful, the payment is released, otherwise it is denied. Also if no device 307 is found in the proximity of the computer 301, the authorisation for the payment is not given. Optionally, the system can also alert the phone number about the failed payment attempt. The system can also be instrumented in such a way a payment receipt is downloaded to the authentication device using the same transport channel of authentication.

As an additional feature, if the second layer authentication fails, the owner can be alerted leveraging the additional cellular information. The preferred embodiment can also leverage a user's personal information (and user's external device) to advise a user of an authentication failure, thereby providing almost instantaneous warning to the user of a potential breach in their security.

Furthermore, the second security layer can be also profiled based on multiple factors:
price of objects (defining thresholds of expense)
type of objects (for example books, electronic
website (the card can define some URL as friend URL avoiding second layer of security) so that the additional security layer can be activated or not.

Figure 4:
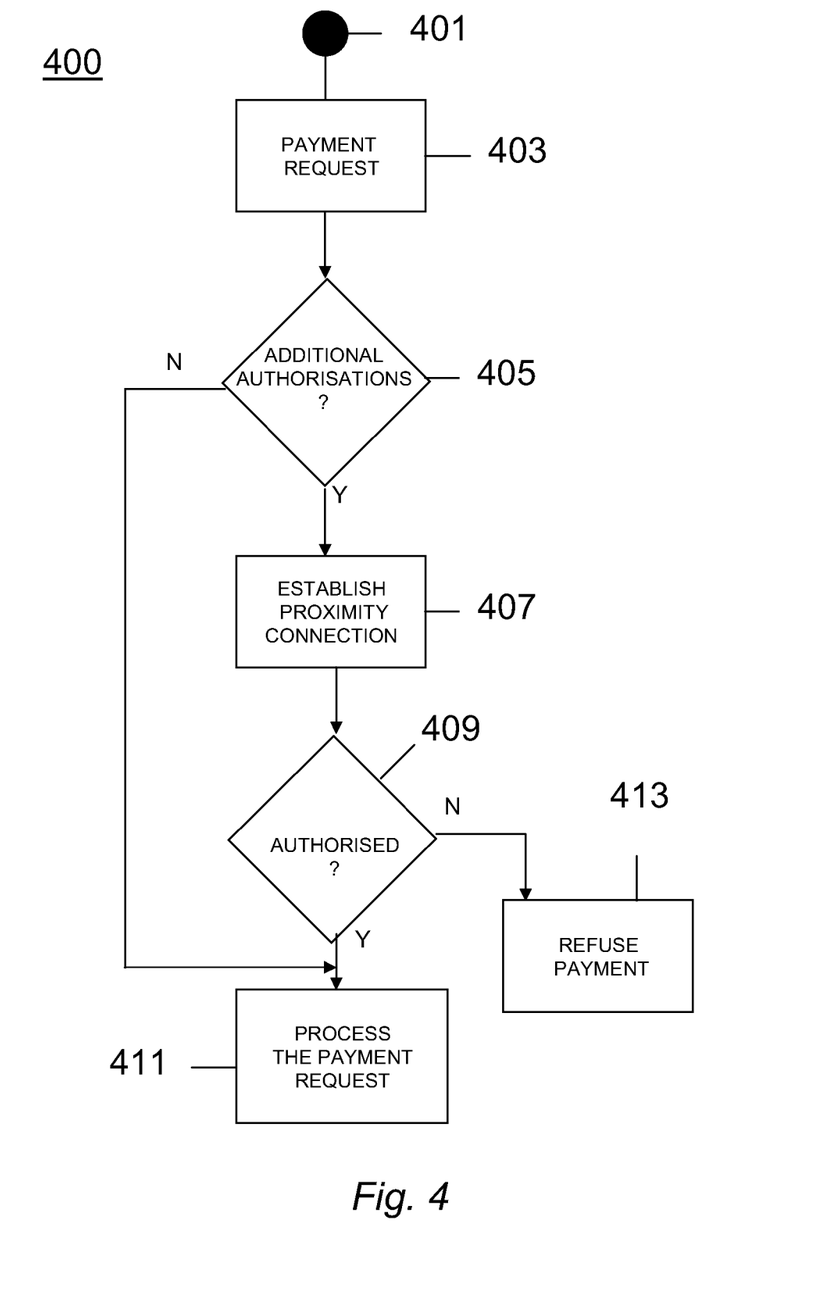
FIG. 4 is a flow chart of the method of the preferred embodiment.

Referring to FIG. 4, the steps of a method according to a preferred embodiment of the present invention are described. The process starts at 401 and goes to step 403 where a payment request is handled during an online shopping session performed by a user through an Internet browser from a computer (e.g., a personal computer). The second layer security check according to the present invention is an additional step to the usual authorisation procedure. Therefore, it can be performed before or after the usual verification/authorisation steps: steps 403 and 411 of FIG. 4 represent the usual flow of a state of the art authorisation process and it does not make any difference whether the "main" authorisation has been obtained before the additional security check (i.e. before step 405 of FIG. 4) or it is conditioned by the result of the additional security check of the present invention (i.e. it is performed only if the additional check herein described has been successful). At step 405, it is verified whether an additional check is required. As mentioned before, this is an optional check and it could be useful if the user wishes to perform the additional check only in predetermined circumstances or wishes to exclude the check in some cases (e.g., for low amounts). If the result of this step 405 is No, the process goes directly to step 411 and the usual authorisation process can continue, otherwise the system tries to establish the proximity connection as described above. According to a preferred embodiment of the present invention such connection is based on Bluetooth communication protocol and requires that the computer where the browser is installed is adapted to establish Bluetooth communications and that a Bluetooth device is in close proximity with the computer. In a preferred embodiment, the plug-in 305 (see FIG. 3) will try to establish a Bluetooth handshake with the phone identified in the card used to make the payment request (assuming that the phone is in range of the Bluetooth transmitter) and checking the IMEI code retrieved from the phone against the IMEI code detailed in the payment card. A prerequisite of this method is that the users had previously configured their payment card with selected information pertaining to one or more of their personal devices which will be contacted by the system.

In this way, even if the information of the credit card are known by an unauthorized user, the system will not allow the use of such credit card. If the connection (e.g., the Bluetooth connection) does not give the expected results (or no Bluetooth phone is found in the range) the payment is refused, otherwise the usual authorisation process can continue.

Referring to step 407, those skilled in the art will appreciate that other ways of communications could be used as well, e.g., instead of a Bluetooth transmission an equivalent system could be implemented by using RFID tags. In such case the plug-in 305 will attempt to read the secret information or password stored in the RFID tag identified in the card used for making the payment request. Yet another example is the use of infra-red devices, e.g., IrDA devices.

Alterations and modifications may be made to the above without departing from the scope of the invention. Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computer has a different structure or includes equivalent units; in any case, it is possible to replace the computer with any code execution entity (such as a PDA, a mobile phone, and the like).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

The invention claimed is:

1. A method for an additional authorization of an electronic payment information, the method comprising:
   a computer configuring a payment card with information associated with at least one device wherein the information includes one or more uniform resource locator (URL) addresses designated as a friend URL for which the additional authorization is not required, a price threshold requiring the additional authorization, and a type of object threshold requiring the additional authorization;

the computer receiving the electronic payment information from the payment card at a browser running on the computer, wherein the browser requires the additional authorization for the payment card in addition to a main authorization process when a uniform resource locator address associated with the browser has not been designated as the friend URL, and one of the price threshold and the type of object threshold has been met;

the computer, responsive to determining that the uniform resource locator address associated with the browser has not been designated as the friend URL, and one of the price threshold and the type of object threshold has been met, suspending the main authorization process;

the computer, responsive to suspending the main authorization process, establishing a connection with a cell phone of the user;

the computer, responsive to establishing the connection with the cell phone of the user, retrieving an additional information associated with the electronic payment information, wherein the additional information is an identifier associated with both the cell phone and the payment card, and wherein the additional information includes one of the type of object threshold and the threshold of expense;

the computer, responsive to receiving the additional information, using the additional information to complete the additional authorization process; and the computer, responsive to completing the additional authorization process, completing the main authorization process.

2. The method of claim 1 further including:
refusing the additional authorization in the event the additional authorization process is unsuccessful;
notifying an owner of the card of an unsuccessful additional authorization using personal information of the user and an external device of the user to advise the user of an authentication failure, thereby providing substantially instantaneous warning to the user of a potential breach in a security of the user.

3. The method of claim 1 further including:
refusing the additional authorization in the event the computer does not connect with the cell phone;
notifying an owner of the card of the failed connection.

4. A computer program product for performing an additional authorization of an electronic payment information, the computer program product comprising:
one or more non-transitory computer readable mediums;
computer program instructions stored in at least one of the one or more non-transitory computer readable mediums for configuring a payment card with information associated with at least one device wherein the information includes one or more uniform resource locator (URL) addresses designated as a friend URL for which the additional authorization is not required, a price threshold requiring the additional authorization, and a type of object threshold requiring the additional authorization;
computer program instructions stored in at least one of the one or more non-transitory computer readable mediums for receiving the electronic payment information from a payment card at a browser running on the computer, wherein the browser requires the secondary authorization for the payment card in addition to the main authorization process when a uniform resource locator address associated with the browser has not been designated as the friend URL, and one of the price threshold and the type of object threshold has been met;
computer program instructions stored in at least one of the one or more non-transitory computer readable mediums for, responsive to receiving the electronic payment information, establishing a connection with a cell phone of the user;
computer program instructions stored in at least one of the one or more non-transitory computer readable mediums for, responsive to determining that the uniform resource locator address associated with the browser has not been designated as the friend URL, and one of the price threshold and the type of object threshold has been met, suspending the main authorization process;
computer program instructions stored in at least one of the one or more non-transitory computer readable mediums for, responsive to suspending the main authorization process, establishing the connection with the cell phone of the user;
computer program instructions stored in at least one of the one or more non-transitory computer readable mediums for, responsive to establishing the connection with the cell phone of the user, retrieving the additional information, wherein the additional information is an identifier associated with both the payment card and the cell phone, and wherein the additional information includes a type of object and a threshold of expense;
computer program instructions stored in at least one of the one or more non-transitory computer readable mediums for, responsive to receiving the additional information, using the additional information to complete the additional authorization process; and
computer program instructions stored in at least one of the one or more non-transitory computer readable mediums for, responsive to completing the additional authorization process, completing the main authorization process.

5. A computer program product of claim 4, further comprising:
computer program instructions stored in at least one of the one or more non-transitory computer readable mediums for refusing the additional authorization in the event the additional authorization process is unsuccessful; and
computer program instructions stored in at least one of the one or more non-transitory computer readable mediums for notifying the an owner of the card of an unsuccessful additional authorization using personal information of the user and an external device of the user to advise the user of an authentication failure, thereby providing substantially instantaneous warning to the user of a potential breach in a security of the user.

6. The computer program product of claim 4, further comprising:
computer program instructions stored in at least one of the one or more non-transitory computer readable mediums for refusing the authorization in the event the computer does not connect with the cell phone; and
computer program instructions stored in at least one of the one or more non-transitory computer readable mediums for notifying an owner of the card of a failed detection.

7. A system for providing an additional authorization of an electronic payment information, the system comprising a data processor coupled to a memory having instructions stored therein that are configured to perform the steps of:
configuring a payment card with information associated with at least one device wherein the information includes one or more uniform resource locator (URL) addresses designated as a friend URL for which the additional authorization is not required, a price threshold requiring the additional authorization, and a type of object threshold requiring the additional authorization;

receiving the electronic payment information from the payment card at a browser running on the computer, wherein the browser requires the additional authorization for the payment card in addition to a main authorization process when a uniform resource locator address associated with the browser has not been designated as the friend URL, and one of the price threshold and the type of object threshold has been met;

responsive to determining that the uniform resource locator address associated with the browser has not been designated as the friend URL, and one of the price threshold and the type of object threshold has been met, suspending the main authorization process;

responsive to suspending the main authorization process, establishing a connection with a cell phone of the user;

responsive to establishing the connection with the cell phone of the user, retrieving an additional information associated with the electronic payment information, wherein the additional information is an identifier associated with both the cell phone and the payment card, and wherein the additional information includes one of the type of object threshold and the threshold of expense;

responsive to receiving the additional information, using the additional information to complete the additional authorization process; and responsive to completing the additional authorization process, completing the main authorization process.

* * * * *